United States Patent [19]
Huber

[11] Patent Number: 5,489,117
[45] Date of Patent: Feb. 6, 1996

[54] OCCUPANT RESTRAINT SYSTEM

[76] Inventor: John F. Huber, 14402 N. Tenth St., Phoenix, Ariz. 85022

[21] Appl. No.: 280,074

[22] Filed: Jul. 25, 1994

[51] Int. Cl.⁶ .......................... B60R 21/28; B60R 21/26
[52] U.S. Cl. ............................................ 280/738; 280/739
[58] Field of Search .......................... 280/728 R, 730 R, 280/738, 739, 729, 743 R, 728.1, 730.1, 743.1

[56] References Cited

U.S. PATENT DOCUMENTS

| | | |
|---|---|---|
| 3,675,942 | 7/1972 | Huber . |
| 3,761,111 | 9/1973 | Kemper ................................... 280/729 |
| 3,840,246 | 10/1974 | McCullogh, Jr. et al. . |
| 3,883,154 | 5/1975 | McCullogh, Jr. et al. . |
| 3,887,213 | 6/1975 | Goetz . |
| 3,929,350 | 12/1975 | Pech . |
| 3,994,506 | 11/1976 | Weman .................................. 280/738 |
| 4,076,277 | 2/1978 | Kuwakado et al. ..................... 280/738 |
| 4,126,325 | 11/1978 | Weman .................................. 280/738 |
| 4,500,114 | 2/1985 | Grey, Jr. ................................. 280/742 |
| 5,338,061 | 8/1994 | Nelson et al. .......................... 280/736 |
| 5,351,977 | 10/1994 | Grace ..................................... 280/739 |

FOREIGN PATENT DOCUMENTS

| | | | |
|---|---|---|---|
| 1455482 | 11/1976 | United Kingdom ................... 280/738 |
| WO90/09908 | 9/1990 | WIPO .................................... 280/739 |

*Primary Examiner*—Karin L. Tyson
*Attorney, Agent, or Firm*—Cahill, Sutton & Thomas

[57] ABSTRACT

An occupant restraint system is disclosed incorporating a cushion structure or air bag having an impermeable external wall and a permeable internal wall with gas passageways therebetween. The air bag is mounted on a pair of gas manifolds having manifold gas ports communicating with the gas passageways in the air bag. Gas generator units are secured to the manifolds and are actuatable through impact signals to create high pressure gas directed through generator nozzles into the manifolds and subsequently into the gas passageways of the air bag. A valve plate supports a plurality of inlet reed valves operating in conjunction with a corresponding plurality of inlet ports to admit ambient air from within the vehicle into the expanding air bag; a pair of bi-level exhaust valves permit the escape of high pressure gas and air from within the air bag into the vehicle interior upon completion of the deployment of the air bag. The exhaust valves restrict the rate of exit of the gas and air from within the air bag when an increase in the internal air bag pressure occurs such as caused by occupant impact.

7 Claims, 4 Drawing Sheets

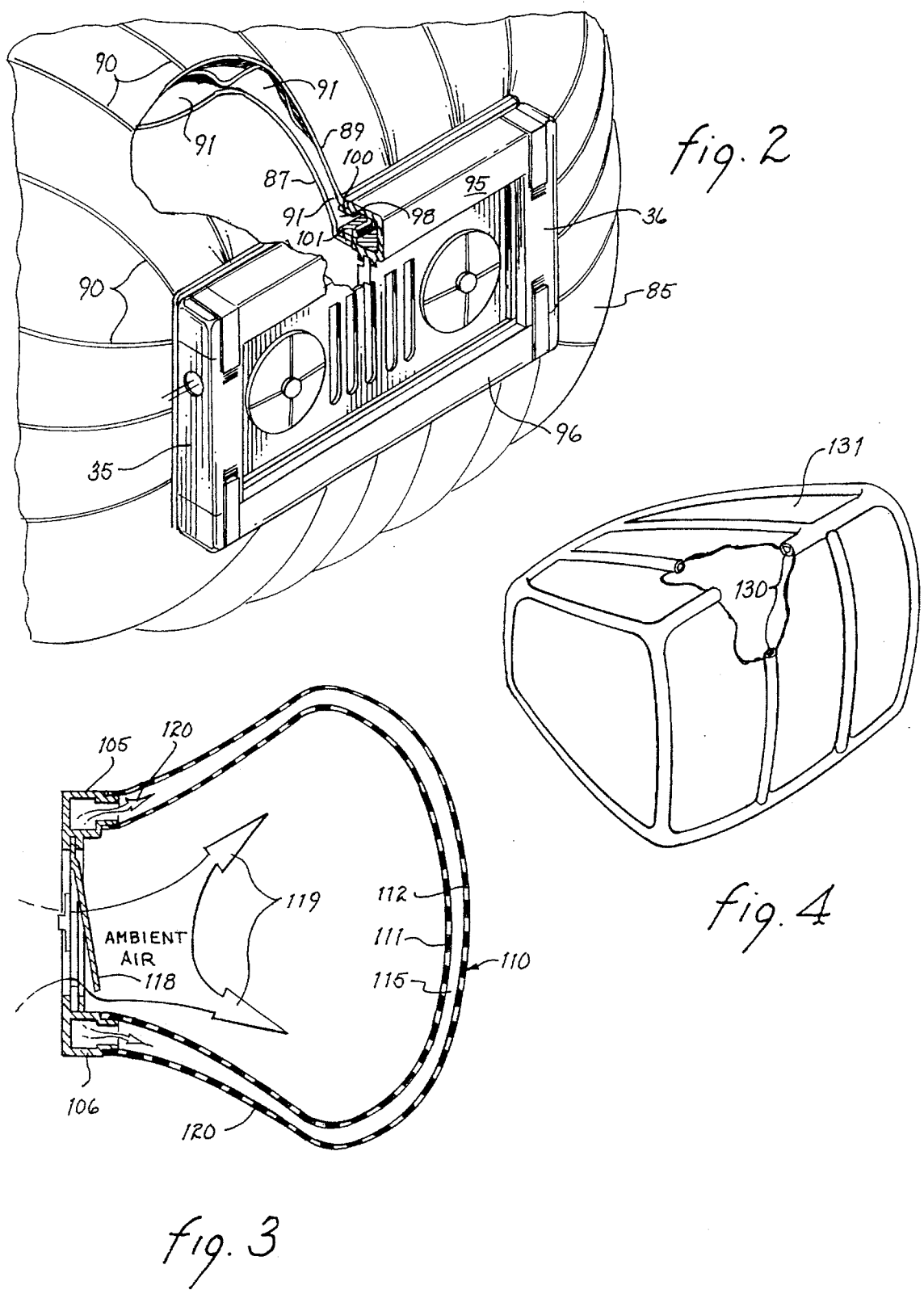

OCCUPANT RESTRAINT SYSTEM

FIELD OF THE INVENTION

The present invention pertains to collision survival systems, and more particularly, to occupant restraining systems to prevent occupants in a vehicle from colliding with hard surfaces or possible injury producing objects within a vehicle at the time of a collision.

BACKGROUND OF THE INVENTION

Numerous devices have been suggested in the prior art to avoid collision between occupants in a vehicle and elements of the vehicle as a result of an external collision. These devices include a variety of restraining systems intended to keep the occupant(s) in a relatively fixed position in relation to the interior of a vehicle. Inflatable bags have been described wherein the uninflated bag is strategically positioned such that, when inflated, the bag presents a resilient cushion to receive and absorb the energy of an occupant being displaced as a result of a vehicular collision.

Inflatable bag systems are associated with numerous technical difficulties, including but not limited to, the complexity of the inflating media, the limitation on the quantity of survival units that may be safely installed in a single closed vehicle and the predictable timely collapse of the unit to aid in the occupant's egress from the damaged vehicle. In order for an occupant restraint system to be effective, it must assume a certain minimum volume within a few milliseconds of receipt of a trigger signal to function. This presupposes the storage of an inflating media in sufficient quantity to accomplish the required inflation function. The larger the restraint cushion (bag) the more of the inflation media that is required. Current technology usually provides either a chemical gas producing media, usually activated by controlled combustion or a stored high pressure gas source that inflates the bag upon its release, or, a combination of both, usually referred to as a "hybrid" system. The system described herein addresses these problems through a design that uses ambient air to inflate approximately 90% of the inflatable volume and a chemical gas producer, or, high pressure stored gas to inflate the remaining 10% of the bag free volume. In addition, the prepackaged system must be of such a design to minimize its size and weight as well as its simplicity of function when it is provided the correct trigger signal.

A factor which greatly affects the ability of an inflatable system to cope with the "minimum" design criteria is the rising atmospheric pressure within the vehicle as the inflatable bag expands. The total volume of one or more fully expanded bags represents a sizable proportion of the total vehicular closed volume; in view of the necessity for rapidly expanding the bag, the atmospheric pressure within the vehicle increases as the bag rapidly expands. This increasing atmospheric pressure further complicates the performance of most conventional systems by requiring the stored gas system to provide even greater pressure to fill the bag as the bag expands and pushes against the increasing ambient air pressure.

The general design and performance parameters of typical air bag function requires that the air bag accomplish extremely rapid inflation and then an equally rapid deflation so that a total cycle is anywhere from 50 to 100 milliseconds in length. This requirement usually is vague regarding the time cycle requirement versus the actual impact "G" force experienced by the occupant. As an example, in an 5G impact, the air bag can inflate and proceed to the deflated status in the 50 to 100 millisecond time frame, however, the same 5G impact can become 10 or 15 or even 20 g's if the impact cause is moving at any higher velocity than that required to generate the 5G level. At the higher g level the air bag will deflate in a shorter time frame, allowing the kinetic energy of the occupant to deteriorate much less than in the 5G impact and, thus, create a circumstance where the elevated level of residual kinetic energy is likely to be absorbed as the occupant travel deflates the air bag and then proceeds to impact the air bag surrounding structure.

OBJECTS OF THE INVENTION

It is therefore an object of the present invention to provide a collision survival system incorporating an inflatable bag.

It is another object of the present invention to provide a collision survival system incorporating an inflatable bag that greatly reduces the required gas storage for inflation.

It is another object of the present invention to provide a collision survival system incorporating an inflatable bag wherein the ambient atmosphere within the vehicle is utilized to fill the majority of the bag, thereby reducing the effects of increased atmospheric pressure as the bag expands.

It is still another object of the present invention to provide a collision survival system incorporating an inflatable bag wherein the bag utilizes passageways therein connected to a gas source which, when activated, inflates the passageways and extends the bag, resulting in the ingestion of the internal atmosphere of the vehicle into the core area of the bag.

It is still a further object of the present invention to provide a design that insures the ability to allow safe removal of the unused stored gas media prior to any future planned demolition of the vehicle so it may be disposed of in an environmentally sound manner.

It is also an object of the present invention to provide a collision survival system incorporating an inflatable bag with an automatic (g sensitive) deflation mechanism.

These and other objects of the present invention will become apparent to those skilled in the art as the description thereof proceeds.

SUMMARY OF THE INVENTION

Briefly, in accordance with the embodiment chosen for illustration, an occupant restraint system is provided with a mounting structure for mounting gas generator units and directing the gas therefrom through manifolds into an occupant cushion structure such as an air bag. Gas generators are mounted at the ends of a pair of manifolds, each of which incorporates a plurality of gas ports for directing gas from the gas generator into gas passageways provided in an air bag. The air bag is provided with an impermeable outer wall and a permeable inner wall with gas passages formed therebetween by stitching the walls together along predetermined paths. Gas from the gas generators is directed through the manifolds and the gas ports into the gas passageways within the air bag to cause the expansion and deployment of the air bag. A plurality of air inlet ports communicate with the interior of the bag to admit ambient air through the inlet ports into the interior of the bag as the bag expands and while the interior pressure is below ambient pressure. When the bag is fully deployed and the pressure therewithin increases, the inlet ports are closed and exhaust valves are opened. The ambient air entering through the inlet ports is taken from the interior of the vehicle in which the system of the present invention is mounted to prevent any significant increase in interior vehicle air pressure resulting from the expanding volume of the air bag. The exhaust valves are provided with a bi-level operation wherein the rate of exhaust of the gases and air within the deployed air bag is controlled.

BRIEF DESCRIPTION OF THE DRAWINGS

The present invention may more readily be described by reference to the accompanying drawings in which:

FIG. 2 is a schematic rear perspective view of another occupant restraining system constructed in accordance with the teachings of the present invention and including a cushion structure or air bag, and shown partly in section.

FIG. 3 is a cross-sectional view of an occupant restraint system constructed in accordance with the teachings of the present invention showing the cushion structure fully deployed in an expanded position.

FIG. 4 is a perspective view, partly in section, of an alternative construction of a cushion structure for use in the system of the present invention.

DETAILED DESCRIPTION OF THE INVENTION

Figure 1:
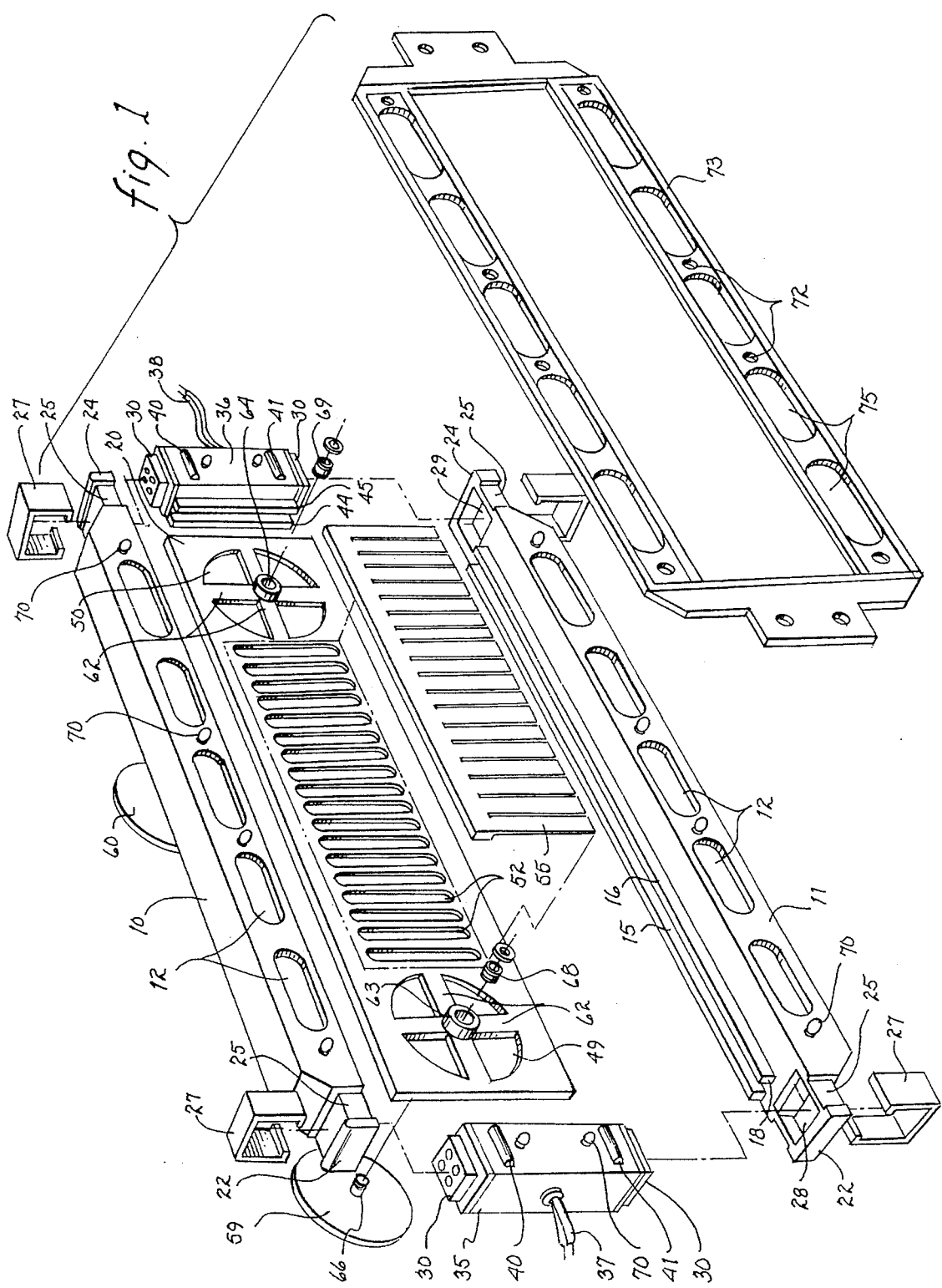
FIG. 1 is an exploded perspective front three quarter view of an occupant restraint system, shown without the cushion structure or air bag, constructed in accordance with the teachings of the present invention.

Referring now to FIG. 1, an exploded perspective three quarter front view of an occupant restraint system constructed in accordance with the teachings of the present invention is shown. The cushion structure or bag is excluded from FIG. 1 for clarity. Upper and lower manifolds 10 and 11, respectively, each incorporate a plurality of manifold gas ports 12 communicating with the interior of the respective manifold for permitting gas to escape from the manifold into an expanding cushion or bag. Each manifold also includes a pair of alignment rails such as rails 15 and 16 on manifold 11 extending longitudinally thereof and positioned to form a valve plate channel 18 therebetween. The channel 18 is intended to position and support a valve plate 20 between the manifolds 10 and 11. The valve plate 20 is a generally rectangular flat structure for positioning and supporting valves to admit gas into and permit gas to exhaust from the cushion structure or air bag. The respective ends 22 and 24 of the manifolds 10 and 11 incorporate clip assembly channels 25 for receiving and positioning respective assembly clips 27 to permit the entire structure to be secured by an easily removable fastening means.

The opposing ends 22 and 24 of the respective manifolds 10 and 11 incorporate passageways terminating in openings such as openings 28 and 29 in manifold 11 for receiving gas generator nozzles 30 secured to opposite ends of the gas generator units 35 and 36. In the embodiment chosen in FIG. 1, gas generator units are shown; however, the source of high pressure gas for operation of the air bag can come from a pressure storage system if desired. In the embodiment shown in FIG. 1, each gas generator unit 35, 36 is electrically actuated through an appropriate signal applied to corresponding conductors 37, 38. Each of the gas generator units 35, 36 are provided with a pair of ridges 40 and 41 for contacting and securing the respective assembly clips in position, thus maintaining the upper and lower manifolds in operative position in contact with the respective gas generator units. When held in this assembled manner by the assembly clips, the respective gas generator units 35, 36 communicate with the openings such as shown at 28, 29 at the ends of each of the manifolds 10 and 11 through the corresponding gas generator nozzles 30. In this manner, gas generated in the gas generator units is directed through the respective generator nozzles into the interior of the respective manifolds and ultimately outwardly of the manifold gas ports 12 into the interior of selected passageways in the air bag (not shown in FIG. 1). The valve plate 20 is maintained in position by nesting within alignment rails provided in the upper and lower manifolds and secured within the valve plate channels 18. Each of the gas generator units 35 and 36 incorporates similar alignment rails such as those shown at 44 and 45 to form a valve plate channel therebetween. Thus, when the structure of FIG. 1 is assembled, the valve plate 20 is positioned within the valve plate channels of both the upper and lower manifolds as well as the similar valve plate channels formed in each of the gas generator units 35 and 36.

The valve plate 20 includes a pair of exhaust ports 49 and 50 and a plurality of inlet ports 52. The inlet ports 52 are opened or closed in accordance with the position of a corresponding plurality of inlet reed valves 55. The reed valves are secured to the face of the valve plate 20 and sealingly engage the inlet port openings in a manner to be described more fully hereinafter. When the pressure within the air bag (not shown in FIG. 1) is reduced below atmospheric or the ambient pressure within the vehicle, the respective reed valves become "unseated" with respect to their corresponding inlet port and admit ambient air past the reed valves to the interior of the air bag. If the gas pressure within the air bag exceeds the ambient air pressure, the respective inlet reed valves seat respectively over the corresponding inlet port and block the outflow of any gas from within the air bag. A pair of bi-level exhaust valves 59 and 60 are secured in operable relationship with respect to the corresponding exhaust ports 49 and 50, respectively, to permit the escape of gas from within the air bag to the atmosphere in a controlled manner and under predetermined conditions. The exhaust valves 59 and 60 are shown mounted over the corresponding exhaust ports 49 and 50 through the utilization of supporting legs 62 formed integrally with the valve plate and which in turn support corresponding journals 63 and 64, respectively. The journals receive exhaust valve shafts such as shaft 66 which are slidably secured within the supporting journals and are biased to close the corresponding exhaust valve through biasing springs 68 and 69, respectively.

The inlet reed valves 55 are secured in any conventional means to the valve plate 20 in their corresponding positions over the inlet ports 52. The reed valves may be constructed of a suitable material having sufficient flexibility to permit the valves to move away from or into contact with the corresponding inlet port in a manner well known. The entire assembly of FIG. 1 may be disassembled or reassembled without the use of special tools which therefore renders the maintenance or servicing of the system of the present invention convenient. When assembled, the corresponding manifolds 10, 11 and gas generator units 35, 36 are secured with the corresponding gas generator nozzles nesting into the openings provided at either end of the respective manifolds. The gas generator units and the manifolds are maintained in this assembled position through the utilization of the assembly clips 28, each of which extends within its corresponding assembly clip channel 25 and contacts and lockingly engages the corresponding ridges 40 and 41. The valve plate is thus captured within the valve plate channels provided in each of the manifolds and in each of the gas generator units.

The exhaust valves 59 and 60 are mounted on the valve plate and are operably secured within their supporting journals in contact with the corresponding exhaust ports while the inlet reed valves are attached to the face of the valve plate and are positioned against their respective inlet ports. The manifolds 10 and 11 as well as the gas generator units 35 and 36 include a plurality of alignment pins 70 that are positioned to extend into corresponding alignment holes 72 in a mounting frame 73. When the alignment pins are received into the respective alignment holes of the mounting frame the entire assembly is locked in its assembled position with mounting frame ports 75 aligned with corresponding manifold gas ports 12 to permit gas to exit from the assembly into the interior of selected portions of an air bag.

Referring to FIG. 2, a schematic rear perspective view of another occupant restraint system constructed in accordance with the teachings of the present invention is shown including an air bag or cushion structure, and showing a portion of the structure in cross-section to facilitate the description thereof. The restraint system of FIG. 2 is similar to that shown in FIG. 1, but displays the rear of the structure and is designed to be somewhat more compact and incorporate fewer inlet ports. This embodiment also includes first and second gas generator units 35 and 36, each of which is electrically actuated by appropriate energization of electrical conductors. While the embodiment chosen for illustration incorporates the use of two gas generators, it will be obvious to those skilled in the art that a single generator unit may be used; similarly, while the embodiment chosen for illustration incorporates electrical actuation of the gas generators, it is entirely feasible to utilize mechanical or laser actuation. The precise configuration of the mounting frame, and the manner in which the air bag or cushion structure is secured will depend on the specific application of the system including the position of the system within a vehicle as well as the type of vehicle in which the system is to be installed. The air bag 85 is shown in a deployed position and includes an inner flexible wall 87. The inner flexible wall is chosen from gas permeable materials such that high pressure gas may migrate or pass therethrough but is slowed in the transition. Woven fabrics that have not been subjected to a sealing treatment may be found appropriate for the inner flexible wall. The outer flexible wall 89 is impermeable; that is, high pressure gas cannot pass therethrough. The inner and outer walls 87 and 89 are joined such as by spaced stitching or cementing along predetermined paths 90 to form gas passageways 91 between the inner and outer walls. In the embodiment chosen for illustration in FIG. 2, the air bag is secured to the system manifolds 95 and 96 with the gas passageways 91 communicating with the manifolds through the gas port such as shown at 98. The specific design of the air bag and its particular attachment to the manifolds will depend on numerous factors. In FIG. 2, the mounting frame 100 is provided with extending lips 101 over which the air bag gas passageways are secured.

Referring to FIG. 3, a cross-sectional view of an occupant restraint system constructed in accordance with the teachings of the present invention is shown and includes a cushion structure or air bag fully developed in a deployed position. The upper and lower manifolds 105 and 106 support an air bag 110 having a permeable inner flexible wall 111 and an impermeable flexible outer wall 112. The manifold communicates with the passageways 115 positioned between the respective flexible walls to permit high pressure gas to escape from the manifolds into the gas passageways within the flexible walls. In FIG. 3, an inlet reed valve 118 is shown in an opened position admitting ambient air as indicated by the arrows 119 into the interior of the air bag. The entering flow of ambient air is caused by the below atmospheric pressure resulting from the erection of the air bag; the expansion of the air bag in turn being caused by the flow of high pressure gases from the manifolds as indicated by the arrows 120 into the passageways between the inner and outer flexible walls of the air bag.

In the embodiment shown in FIG. 2 and shown partly in section in FIG. 3, the air bag was formed of inner and outer flexible walls, the inner of which was permeable and the exterior of which was impermeable. The walls were connected such as by stitching or cementing to form gas passageways between the respective walls. An alternative construction is shown in FIG. 4 wherein it may be seen that a plurality of gas passageways 130 are formed by tubular members connected to receive high pressure gases from the manifolds of the present invention. The tubular members 130 are interconnected by a single sheet of impermeable flexible material 131 such that when high pressure gas is admitted to the tubular members, the bag extends and assumes a shape similar to that shown in FIG. 4 causing ambient air to flow into the bag during bag deployment. There are several other possible constructions of air bags suitable for use in the system of the present invention; however, it is believed that the doubled wall construction shown and described in connection with FIGS. 2 and 3 is the preferable embodiment. In the latter embodiment, the permeable inner wall permits the formation of an internal gas passages to efficiently permit the rapid inflation of the air bag while nevertheless permitting appropriate deflation of the bag by migration of the high pressure gases from the interior of the passageways though the permeable flexible inner wall into the interior of the air bag and outwardly therefrom through the outlet valves after the bag has been deployed and has accomplished its purpose.

Figure 5:
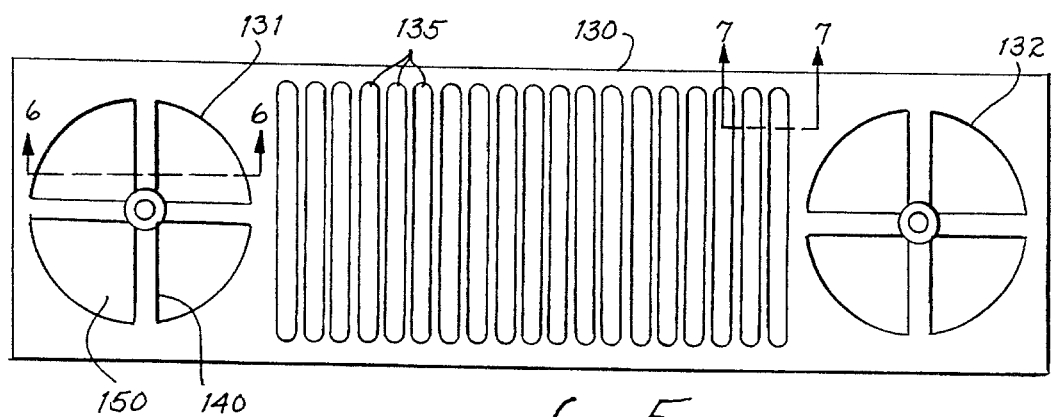
FIG. 5 is a rear elevational view of the valve plate of the present invention.
Figure 6:
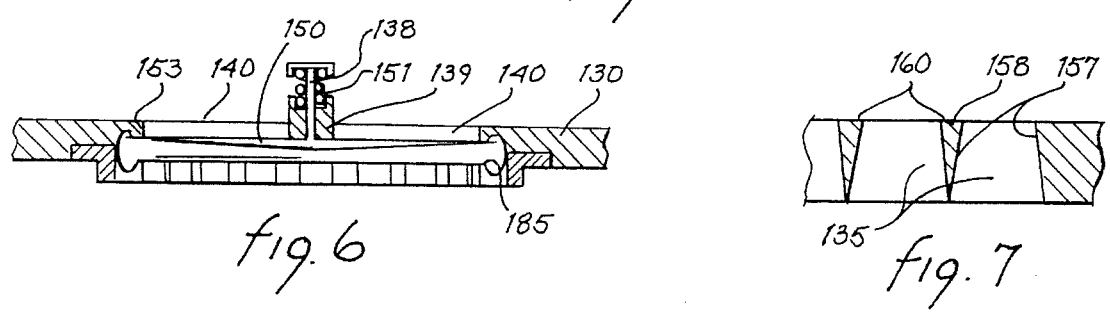
FIG. 6 is a cross-sectional view of a portion of FIG. 5 taken along line 6—6.
Figure 7:
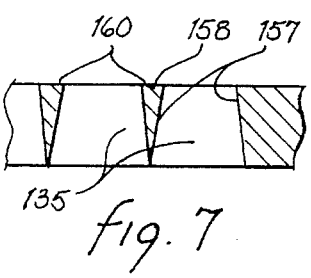
FIG. 7 is a cross-sectional view of a portion of FIG. 5 taken along line 7—7.

Referring now to FIG. 5, a rear elevational view of the valve plate of the present invention is shown and revealing the preferred configuration of the bi-level exhaust valves and exhaust ports. The figure also shows inlet ports and the preferred configuration thereof. FIGS. 6 and 7 are cross-sectional views taken along lines 6—6 and 7—7, respectively, and will now also be referred to. The valve plate 130 includes a pair of exhaust ports 131 and 132 and a plurality of inlet ports 135 in a manner similarly described in connection with FIG. 1. The exhaust valves are bi-level; that is, the total area opened for the passage of escaping air and gas from within the air bag to the atmosphere will depend on the pressure differential existing across the valve. As shown in FIG. 6, an exhaust valve shaft 138 extends through a supporting journal 139 mounted on supporting legs 140 formed integrally with the valve plate 130. The exhaust valve shaft 138 is secured to the valve 150 and is urged into a valve-closed position through the utilization of a biasing spring 151. The valve thus shown in FIG. 6 is in its normally closed position. When an initiating event occurs and the gas generator units of the system of the present invention are energized to provide high pressure gas to the air bag; gas passageways of the resulting expansion of the air bag creates a negative pressure within the bag as the latter expands. The exhaust valve is then in its seated position as shown in FIG. 6 and thus remains in that position during the inflow of ambient air into the bag. When the bag has fully deployed, and the pressure in the air bag is no longer below ambient, the exhaust valve remains in contact with the valve seat to prevent the escape of air from the interior of the air bag to atmosphere. If no occupant strikes the deployed bag, it will gradually collapse—two to three seconds. If an occupant strikes the bag, the exhaust valve will open to permit controlled escape of air/gas through the valve to the interior of the vehicle. However, the rate at which the gas may escape from the interior of the air bag will depend on the pressure differential between the interior of the air bag and ambient; that is, if the exhaust valve 150 moves away from the valve seat 153, gas is permitted to escape through the area around the outer edges of the exhaust valve to atmosphere. If the pressure differential is sufficient to further compress the biasing spring 151 (such as caused by a higher G impact between the occupant and the deployed air bag) the exhaust valve 150 contacts the exhaust valve restrictor seat 155, gas is permitted to continue to escape but through a lesser area and at a lesser rate. Thus, the exhaust valve restrictor seat 155 reduces the exhaust valve area through which the escaping gases may pass. The reduction in area will be discussed in greater detail as the description proceeds.

The inlet ports 135 may take any convenient configuration; however, in the embodiment chosen for illustration the ports take the form of a series of parallel openings, each of which is formed with vertically extending side walls and rounded ends. As shown in FIG. 7, the respective inlet ports 135 are formed having tapered walls 157 to provide efficient air flow into the interior of the expanding air bag and also to provide inlet port valve seats 158 having sharp edges 160 to facilitate sealing engagement with corresponding inlet reed valves.

Figure 8:
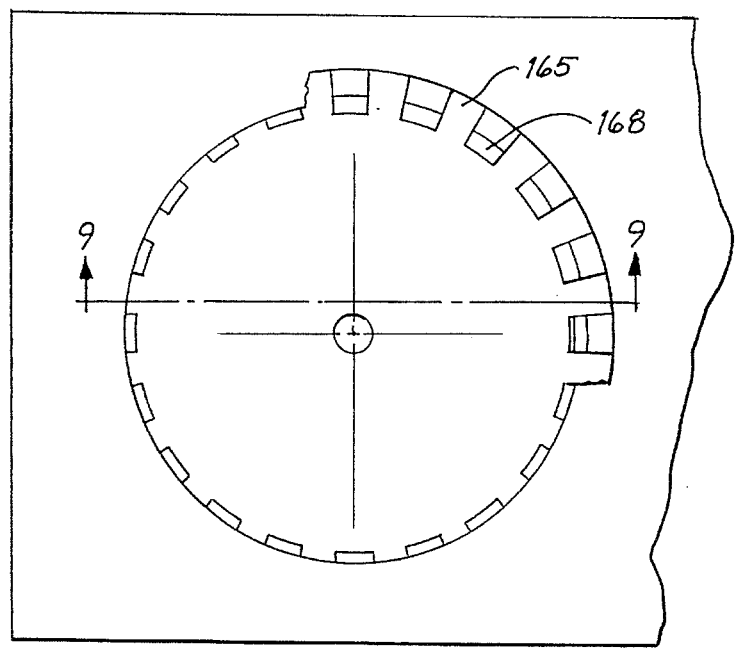
FIG. 8 is a rear elevational view of a portion of the valve plate of the present invention showing the exhaust valve seat area.
Figure 9:
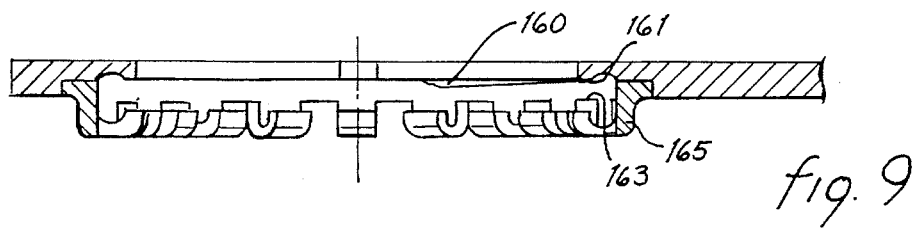
FIG. 9 is a cross-sectional view of a portion of FIG. 8 taken along line 9—9.

Referring now to FIG. 8, a rear elevational view of a portion of the valve plate of the present invention is shown; FIG. 9 is a cross-sectional view of a portion through the valve seat of FIG. 8 taken along line 9—9. In a static or standby condition, the exhaust valve 160 is spring biased with the valve contacting the valve seat 161 circumferentially extending about the circular valve. When the pressure within the air bag is reduced by the introduction of high pressure gas into the gas passageways within the air bag causing deployment of the bag, the exhaust valves remain firmly closed as a result of both the bias spring as well as the differential pressure across the valve tending to keep the valve closed. As the air bag reaches full deployment and the internal pressure thereof increases, the force holding the exhaust valve closed is supplied solely by the bias spring.

Further increasing pressure within the air bag permits the exhaust valve to open thus permitting air to exhaust through the area between the valve 160 and the valve seat 161. In the event of a high pressure surge within the air bag such as may be caused by the impact of an occupant being thrown against the deployed air bag, the exhaust valve is forced further to an open position wherein the valve 160 is forced axially along with the exhaust valve shaft to further compress the biasing spring and cause the valve to contact a secondary valve seat 163. This secondary valve seat 163 is formed of seat plate 165 having a circumferential array of notches 168 which permit air to escape past the seat and past the edge of the valve; however, when the valve is in contact with the secondary valve seat 163, the notches result in a reduction in the area available to the escaping gas and air. Thus, the exhaust valves are bi-level in that they permit a first level of exhaust or rate of exhaust through an air/gas escape area when the air pressure within the deployed air bag increases to a predetermined value and assumes a second position having a smaller air/gas escape area when a high pressure condition exists within the deployed air bag as it is deflating such as occurs when an occupant strikes the air bag at a predetermined higher force level. In this latter circumstance the air is permitted to escape through the exhaust valve but the rate of flow is reduced as a result of the reduced area available for exhaust air passage. The reduction in the rate of flow of the gas and air from within the deployed air bag effectively delays the collapse of the air bag after deployment in the event a very high G impact occurs. In the latter instance, greater force is exerted on the air bag by the object during deceleration; during this high G force impact greater time is required to safely arrest the motion of the object. This variable exhaust rate provided by the varying output area of the exhaust valves permits the air bag to be designed to collapse more rapidly when lower G forces trigger the air bag while providing extended protection in the event of more severe G forces. In the embodiment chosen for illustration, the exhaust valves are bi-level; that is, the area available to the escaping gas and air from within the air bag is at a predetermined design value for lower triggering G forces but is at a lesser level for more severe triggering G forces. It will be obvious to those skilled in the art that the change in the restriction to exhausting air and gases may be provided by a continuously varying valve area in lieu of the two stage or bi-level design of the present environment. However, it is believed that the bi-level arrangement described in connection with the preferred embodiment is less expensive and more readily proven to be reliable.

Figure 10:
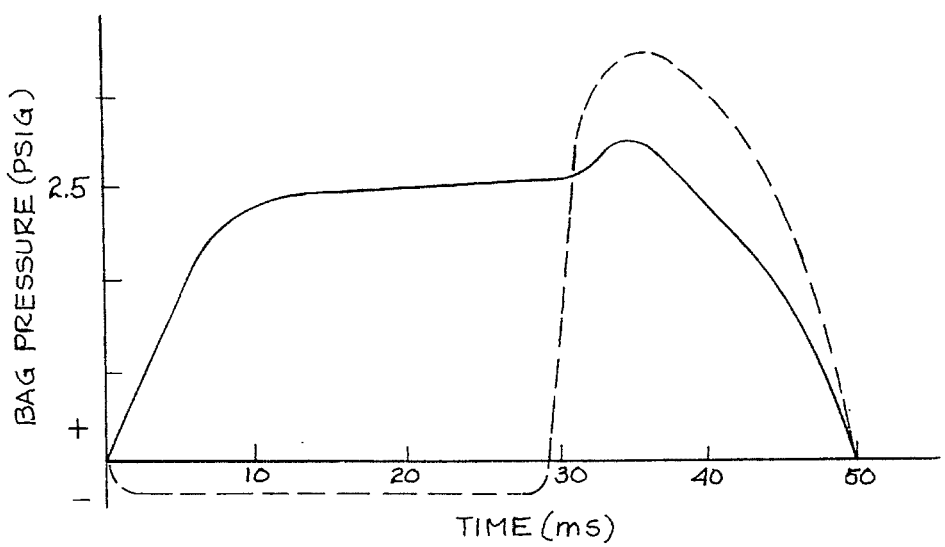
FIG. 10 is a graph of time versus bag pressure useful in describing the operation of the present invention.

The operation of the bi-level exhaust valves, and the effect of their operation may be illustrated by reference to FIG. 10 wherein the pressure existing within an air bag is plotted versus time (beginning with an air bag deployment event such as an impact having a predetermined minimum G force). When an impact having a predetermined G force occurs, high pressure gas is admitted to the air bag and the latter begins to deploy. The solid line in the graph of FIG. 10 is the generator gas pressure. It may be seen that the pressure rapidly increases in approximately 10 milliseconds to a pressure of 2.5 pounds per square inch. The generated pressure remains at this level until approximately 30 milliseconds when an impact occurs with the air bag. At approximately 35 milliseconds the generated pressure increases slightly and then tapers to exhaust atmospheric pressure at 50 milliseconds. The core pressure, or pressure generally within the center of the expanding air bag, is shown in FIG. 10 in broken lines. It may be seen that upon actuation of the air bag, a slight negative pressure occurs during time ambient air is drawn into the core of the bag. When an occupant strikes the expanded bag such as shown at approximately 30 milliseconds, the internal pressure of the bag sharply rises. As the object impacting the expanded air bag is arrested, the pressure falls to atmospheric at approximately 50 milliseconds.

Figure 11:
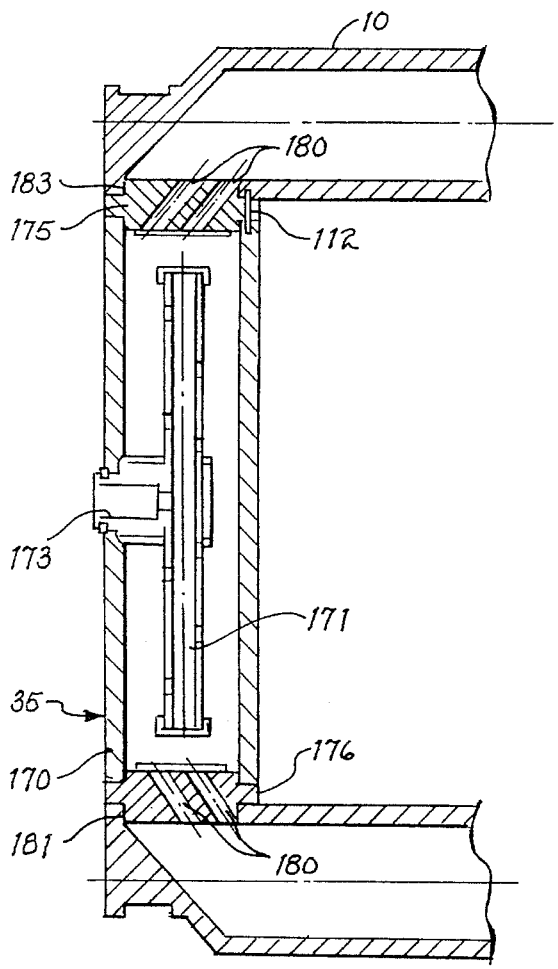
FIG. 11 is a front elevational view, in section, of a portion of the occupant restraint system of FIG. 1 showing a gas generator and the gas flow path into the manifold of the present system.

Referring to FIG. 11, a front elevational view, in section, of a portion of the restraint system of FIG. 1 is shown wherein it may be seen that the gas generator 35 includes a housing 170 within which an ignitor tube 171 is positioned. The housing includes an initiator port 173 in communication with the ignitor tube to receive appropriate electrically energizable conductors. Gas generators of the type used in the system of the present invention are well known to those skilled in the art; any of several commercially available gas generators may be used in the present system. The ends of the gas generator housing are enclosed with gas generator nozzles 175 and 176, each of which may be formed of a ceramic material and each of which incorporates a plurality of holes 180 angled to direct high pressure gas generated within the housing into the interior of the manifolds 10 and 11. To assure appropriate orientation of the angled holes during assembly, an orientation pin 112 may be utilized extending from the ends of the housing into a mating hole provided in the nozzle bodies. The nozzles are formed having a square cross-section and are dimensioned to fit within the gas generator housing openings 183 and 184, respectively; each nozzle incorporates a flange that closes the opening in the respective end of the gas generator housing. The opposite end of each nozzle is also formed into a square shape to fit within a corresponding opening in the end of the respective manifold. The holes 180 are provided for directing the gas generated within the housing at an appropriate angle into the manifolds; the number and size of the holes will be based on the volume and pressure of the gas being generated for the particular application. It may be seen that the gas generator unit can be removed from the system of the present invention by removing the appropriate assembly clips (not shown in FIG. 11) from the assembly clip channels and lifting the upper and lower manifolds from the gas generator unit. The nozzles are secured at the ends of the generator housing and are removable therewith. In this manner, a spent gas generator may be effectively and rapidly removed and replaced essentially without the use of tools. Similarly, the gas generator housing 35 may be removed and the nozzle at one or both ends thereof removed to permit the replacement of an appropriate ignitor tube.

Figures 12A, 12B:
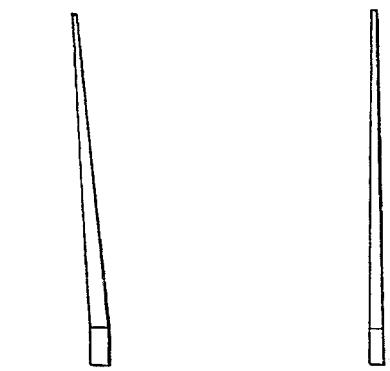
FIGS. 12a, 12b, and 12c are a front elevational view, a side view, and a schematic view, respectively, of reed valves used in the occupant restraint system of FIG. 1.
Figure 12C:
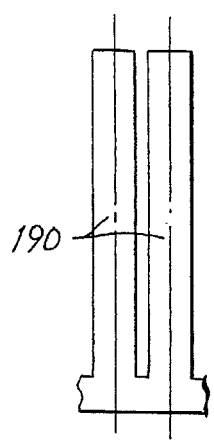

Referring now to FIGS. 12a, 12b and 12c, inlet reed valves are shown in a front elevational view, a side view, and a schematic view respectively. The reed valves 190 may be formed from a single molded semi-rigid plastic material such that each valve extends a sufficient distance to cover a corresponding inlet port. The valves 190 should be sufficiently flexible to bend away from the corresponding inlet port when the pressure within the air bag is reduced below atmospheric as a result of expansion of the bag. However, the reed valves should normally fit against and sealingly engage the corresponding inlet port to prevent the escape of gas and air within the air bag after deployment and after the pressure within the air bag exceeds ambient air pressure. To facilitate a reed structure to accomplish the above function, the flexibility of the reed is enhanced and controlled by slightly tapering the valve as shown in 12b; however, it is important that the facing side of the reed valve, that is the side of the reed valve contacting the inlet port, be flat. To insure sufficient pressure existing on the flat surface against the inlet port, the blade can be manufactured so that it begins tapering at a point somewhat distant from its thicker edge as shown at 192 in FIG. 12c. Thus, when the valve is placed upon the valve plate (FIG. 1) there will be a slight predetermined pressure forcing the flat side of the tapered reed valve against the valve seat formed around the edges of the corresponding inlet port. In this manner, proper sealing is achieved with a minimal predetermined biasing force which will not materially affect the pressure differential required for the opening of the valve.

In operation, the system of the present invention is mounted in accordance with well known principles and is positioned to provide a cushioning structure such as an inflatable air bag in the path of an occupant upon the occurrence of a predetermined impact or G force. The system of the present invention is triggered upon the detection of a threshold G force; the operation is initiated through electrical, laser or mechanical actuation of the initiator conductors. High pressure gas is created within the gas generator housings and is directed outwardly therefrom both upwardly and downwardly through opposing pairs of ceramic gas generator nozzles. Each nozzle incorporates slanted holes for directing the gas generated within the housing into the upper and lower manifolds. The expanding gases travel into the respective manifolds from either end thereof and escape through manifold gas ports, through mounting frame ports and into gas passages provided in the air bag. The air bag is formed with an impermeable outer wall and a permeable inner wall and incorporate gas passages that may be formed by stitching or cementing the inner wall and outer wall of the air bag along predetermined paths. The gas passageways thus formed communicate with the manifold gas ports to receive the high pressure gas being channeled to the air bag from the gas generator units. As the high pressure gas enters the gas passageways in the air bag, the air bag is forced to deploy and expand the interior volume thereof. The expansion of the air bag creates a negative (relative to atmosphere) pressure therewithin thus causing ambient air to pass through the inlet ports through the now opened inlet reed valves into the interior of the air bag. During the opening phase of the air bag the exhaust valves remain biased in the closed position to prevent the escape of any gas from within the air bag. As the bag becomes fully deployed, the high pressure gas migrates through the inner wall of the double walled air bag increasing the pressure within the air bag. When the bag is fully deployed, the sidewalls are no longer expanding the volume of the bag and the tendency to create a negative pressure within the bag ceases. The migration of the high pressure gas through the permeable wall of the bag increases the pressure within the air bag until the pressure exceeds ambient pressure. The respective inlet reed valves are then biased to the closed position and seat against the corresponding inlet port valve seats. However, the exhaust valves now become subjected to a pressure differential that exceeds the closing biasing force of the exhaust valve biasing springs. As a result the valve body of the exhaust valves extend away from the valve seat and permit the higher pressure air and gas within the air bag to escape. Upon the impact of an occupant, or any object, with the air bag, a brief pressure increase is created. The increased internal pressure further moves the respective exhaust valve body away from the valve seat into contact with a secondary valve seat. In the second position with the valve body against the secondary valve seat, air and gas from within the air bag is still permitted to escape; however, the area available for the passage of gas and air is reduced such that the rate of collapse of the air bag is slowed. In this manner, the air bag remains effective even if the occupant or object impacts the air bag after the ideal impact time subsequent to full deployment of the air bag.

The occupant restraint system of the present invention is considerably less complicated and less expensive than known systems of the prior art. The system may be assembled and disassembled without tools and may be "reconstructed" after use by the replacement of gas generator units or replacement of appropriate ignitors and initiators within the generator unit. The entire assembly may be constructed of well known plastic materials and may be molded with the respective parts interchangeable; the latter feature is important when the size of the unit is to be changed to accommodate installation in a different vehicular environment requiring a larger or smaller air bag. Under such circumstances, interchangeable manifold lengths and/or gas generator units may be chosen from standardized parts to facilitate such design. The air bag or cushion structure of the present invention also provides an inexpensive and convenient manner in which to produce rapid deployment while protecting the occupant from high pressure gases that are now typically found to escape through permeable air bag walls. The present invention uses a dual wall system, or an alternative system having permeable tubes to conduct high pressure gas; in either design, an impermeable outer wall protects the occupant against burns or other deleterious affects from high pressure gases.

While the invention has been described with reference to preferred embodiments thereof, the description is for illustrative purposes only and is not to be construed as limiting the scope of the invention. Various modifications and changes may be made by those skilled in the art without departing from the true spirit of the scope of the invention as defined by the appended claims. For example, the specific shape of the manifolds may readily be changed to accommodate the specific application with which the system is to be used. Similarly, the type and shape of the air bag may be modified by incorporation of newer materials becoming available as well as techniques for forming gas passageways within the air bag with the use of permeable materials that have been treated to provide a specific permeability. The manner in which the gas generator is triggered depends on the available sophistication of triggering systems and may likely incorporate laser triggering techniques as development of such techniques proceeds.

What is claimed is:

1. An occupant restraint system for mounting within a vehicle comprising:
   (a) a source of high pressure gas;
   (b) a manifold means connected to receive gas from said source for directing said gas to an air bag for deploying said air bag;
   (c) an air bag having a flexible impermeable outer wall, said bag including gas passageways therein connected to receive gas from said manifold, said gas passageways including a permeable wall for permitting controlled escape of gas from said passageways into said bag;
   (d) inlet valve means positioned to admit ambient air within said vehicle into said air bag during deployment of said bag; and
   (c) exhaust valve means positioned to admit air and gas from within said air bag through an air/gas escape area into said vehicle after deployment of said bag, said exhaust valve means including means responsive to forces caused by an object striking said air bag when deployed for reducing said escape area.

2. The combination set forth in claim 1 wherein said inlet valve means comprises a plurality of openings in communication with ambient air within said vehicle and said air bag and including a plurality of reed valves for closing said openings.

3. The combination set forth in claim 1 wherein said exhaust valve means is bi-level.

4. The combination set forth in claim 1 wherein said means responsive to forces caused by an object striking said air bag when deployed comprises an exhaust valve having a first and a second valve seat wherein said valve contacts said first seat when it is closed, is open when it contacts neither seat, and is opened with a restricted flow area when it contacts said second seat.

5. An occupant restraint system for mounting within a vehicle comprising:
   (a) a source of high pressure gas;
   (b) a manifold means connected to receive gas from said source for directing said gas to an air bag for deploying said air bag;
   (c) an air bag mounted on said manifold means;
   (d) inlet valve means positioned to admit ambient air within said vehicle into said air bag during deployment of said air bag; and
   (e) exhaust valve means positioned to admit air and gas from within said air bag through an air/gas escape area into said vehicle after deployment of said bag, said exhaust valve means including means responsive to forces caused by an object striking said air bag when deployed for reducing said escape area.

6. The combination set forth in claim 5 wherein said exhaust valve means is bi-level.

7. The combination set forth in claim 5 wherein said means responsive to forces caused by an object striking said air bag when deployed comprises an exhaust valve having a first and second valve seat wherein said valve is closed when it contacts said first seat, is open when it contacts neither seat, and is opened with a restricted flow area when it contacts said second seat.

* * * * *